(12) United States Patent
Hassani et al.

(10) Patent No.: US 11,535,194 B2
(45) Date of Patent: Dec. 27, 2022

(54) SYSTEMS AND METHODS FOR REDUCING LATENCY IN VEHICLE ACCESS REQUESTS

(71) Applicant: Ford Global Technologies, LLC, Dearborn, MI (US)

(72) Inventors: Ali Hassani, Ann Arbor, MI (US); Hamid M. Golgiri, Livonia, MI (US); Ryan Joseph Gorski, Grosse Pointe Farms, MI (US); Daniel M. King, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 16/905,374

(22) Filed: Jun. 18, 2020

(65) Prior Publication Data

US 2021/0394713 A1    Dec. 23, 2021

(51) Int. Cl.
*B60R 25/24* (2013.01)
*G06F 21/35* (2013.01)
*B60R 25/10* (2013.01)
*B60R 25/23* (2013.01)
*B60R 25/31* (2013.01)
*B60R 25/04* (2013.01)

(52) U.S. Cl.
CPC .............. *B60R 25/24* (2013.01); *B60R 25/04* (2013.01); *B60R 25/10* (2013.01); *B60R 25/23* (2013.01); *B60R 25/31* (2013.01); *G06F 21/35* (2013.01)

(58) Field of Classification Search
CPC ......... B60R 25/24; B60R 25/04; B60R 25/10; B60R 25/23; B60R 25/31; G06F 21/35
See application file for complete search history.

(56) References Cited

U.S. PATENT DOCUMENTS

| 9,194,168 | B1 | 11/2015 | Lu et al. | |
|---|---|---|---|---|
| 11,210,877 | B1* | 12/2021 | Amadi | G07C 9/22 |
| 2007/0200663 | A1* | 8/2007 | White | B60R 25/255 340/5.31 |
| 2015/0081169 | A1* | 3/2015 | Pisz | H04W 4/40 701/1 |
| 2015/0145648 | A1 | 5/2015 | Winkelman et al. | |
| 2015/0363986 | A1* | 12/2015 | Hoyos | H04L 63/0861 340/5.61 |
| 2016/0225211 | A1* | 8/2016 | Gehin | H04L 67/12 |

(Continued)

OTHER PUBLICATIONS

"Add-on module auto-unlocks your car when your phone is near," Web page <https://www.cnet.com/roadshow/news/add-on-module-auto-unlocks-your-car-when-your-phone-is-near/.html>, 4 pages, retrieved from the internet on Dec. 22, 2020.

*Primary Examiner* — Nay Tun
(74) *Attorney, Agent, or Firm* — Brandon Hicks; Eversheds Sutherland (US) LLP

(57) ABSTRACT

Systems and methods for reducing latency in vehicle access requests are provided herein. An example method includes receiving a first vehicle access request from a user, determining a pre-authenticated status for the user based on authenticating the user in response to the first vehicle access request, determining a pre-authorized status for the user based on the determination of the pre-authenticated status, receiving a second first vehicle access request from the user, and granting access to the vehicle when the user has the pre-authenticated status. Access to the vehicle can be conditioned upon the pre-authorized status of the user.

20 Claims, 9 Drawing Sheets

(56) References Cited

U.S. PATENT DOCUMENTS

| | | |
|---|---|---|
| 2018/0012425 A1 | 1/2018 | Ricci |
| 2019/0159026 A1* | 5/2019 | Rezaei ................ H04L 63/0853 |
| 2020/0186333 A1* | 6/2020 | Schubert ................... H04L 9/14 |
| 2021/0146883 A1* | 5/2021 | Ha ........................ B60W 40/08 |

* cited by examiner

| Critical Path Action Name | Estimated Time per Action (ms) | | | Number of Occurrences for Each Architecture | | |
|---|---|---|---|---|---|---|
| | Best Case | Typical Case | Worst Case | 1 - Basic Challenge/ Response Unlock | 2 - Challenge Response Unlock with Pre-Authentication | 3 - Challenge Response Unlock with Pre-Authentication and Pre-Authorization |
| DAP Tap Input Debounce and Confirmation | 25 | 40 | 75 | 1 | 1 | 1 |
| FD CAN Message Transmission | 10 | 20 | 40 | 7 | 3 | 2 |
| Medium Speed CAN Message | 20 | 40 | 80 | 2 | 2 | 2 |
| General Internal Logical Module Processing | 5 | 10 | 20 | 8 | 6 | 5 |
| Gateway Message Internal ECG Processing | 5 | 10 | 20 | 4 | 2 | 1 |
| SOA API Call | 5 | 10 | 20 | 1 | 1 | 0 |
| Execute Unlock | 20 | 40 | 80 | 1 | 1 | 1 |
| Execute Unlatch | 150 | 150 | 250 | 0 | 0 | 0 |
| Estimated Total Time to Unlock (ms) | | | | | | |
| Best Case | | | | 220 | 160 | 135 |
| Typical Case | | | | 430 | 310 | 260 |
| Worst Case | | | | 855 | 615 | 515 |

FIG. 5

SYSTEMS AND METHODS FOR REDUCING LATENCY IN VEHICLE ACCESS REQUESTS

TECHNICAL FIELD

The present disclosure is generally directed to vehicle access and privilege management in order to reduce latency in challenge and response processes.

BACKGROUND

Management of user authentication and privileges adds latency to traditional vehicle actions. As an example, a process of locking and unlocking the vehicle can today be done with a body control module (BCM) and its array of sensors and actuators—a relatively fast process (estimated at 220 milliseconds of latency). Introducing user rights managements, such as in the case of the autonomous vehicles (for perhaps distinguishing between riders and goods delivery access), adds additional authentication and authorization steps. When assuming the standard challenge-response process, an autonomous vehicle may take an estimated 430 milliseconds on average when accounting for the number of additional processing steps involved.

From a customer perspective, waiting 430 milliseconds to have confirmation of an unlock request is an unsatisfactory user experience. This problem is exacerbated if the user makes the unlock request in the form of passive entry, where they grab the door handle and attempt to directly open the door. If they pull the handle before the process completes, the door will not open and it may appear they are being refused access to their paid ride or simply that the system is too slow.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 5 is a table that comprises empirical time data for challenge-response communication flows of FIGS. 2-4.

DETAILED DESCRIPTION

Overview

The present disclosure pertains to systems and methods for reducing latency for vehicle access and permission requests. The systems and methods may pre-authenticate and pre-authorize a user's request, and also intelligently arbitrate between approach unlock and passive entry events. A vehicle can include various components that can be configured to provide these pre-authentication and pre-authorization features. In general, a user who has been initially authenticated can remain in a managed, pre-authenticated state through use of an authentication manager. For example, an authentication management module can cooperate with a communication module that is configured to perform the initial (or subsequent) authentication requests.

Once authenticated, the user can remain in a pre-authenticated state for a period of time or until the occurrence of a de-authentication event. Further, once a user is in a pre-authenticated state, the authentication manager can communicate with an authorization management module to determine privileges for the user. The user can be pre-authorized by the authorization management module when the authorization management module receives an indication from the authentication management module the user has been determined to be in a pre-authenticated state. The act of pre-authorizing the user includes authorizing the user for all available privileges when the user is in a pre-authenticated state. Thus, after pre-authentication and pre-authorization, subsequent requests to access a vehicle such as a door unlock or ride hailing request can be automatically approved by verification of a pre-authenticated state for the user. In sum, these systems and methods reduce the latency that would occur from piecemeal challenge-response events that require unique authentication and authorization processing operations.

Illustrative Embodiments

Figure 1:
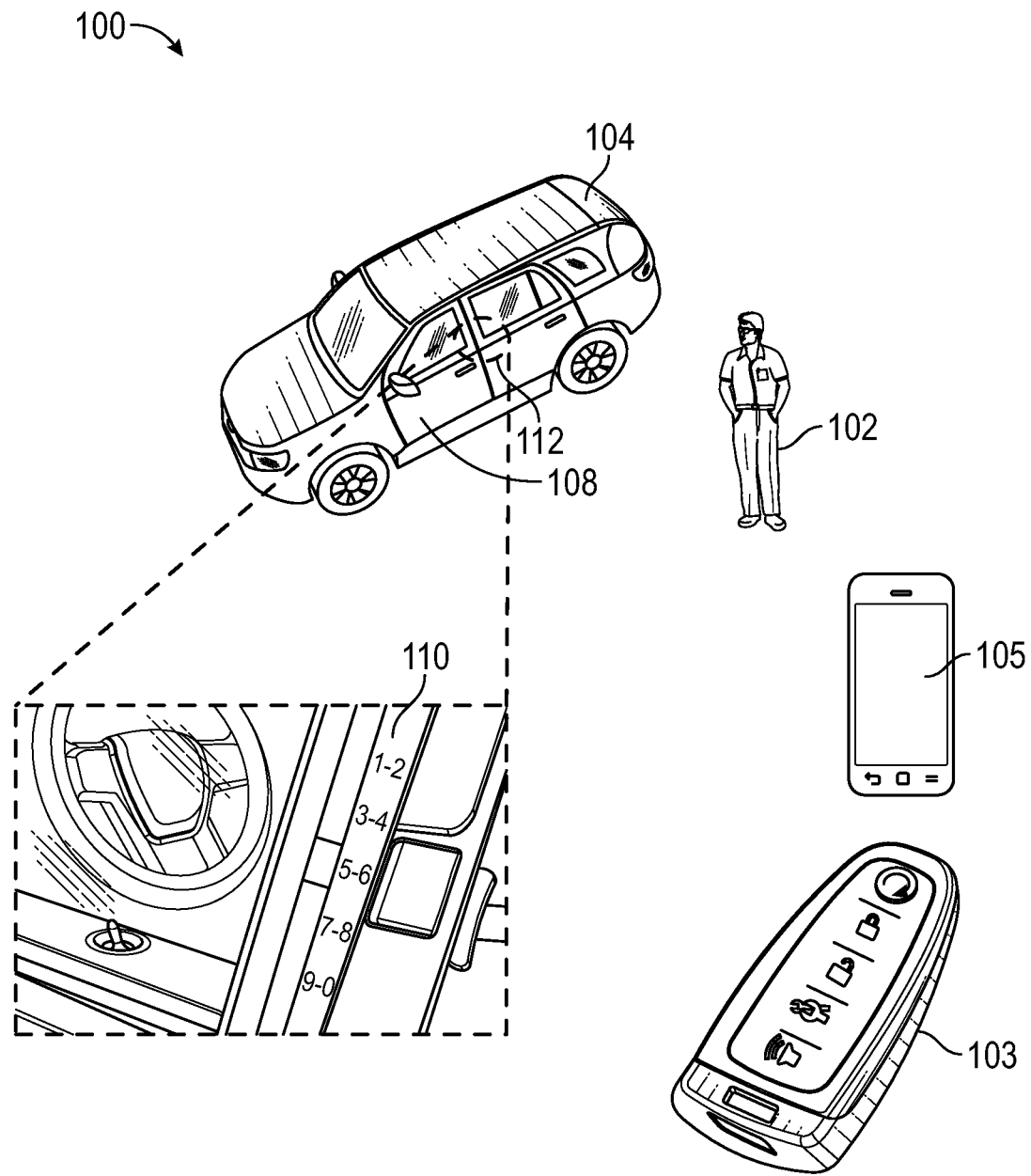
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. In this example, a user 102 is attempting to access a vehicle 104. For example, the user 102 may desire to unlock a door 108 of the vehicle 104 and may attempt to use an access point of the vehicle 104 to unlock and open the door 108. The vehicle 104 can include any number of access points or entry devices such as a key fob 103, or keyless entry (through a mobile device 105) to access the vehicle 104. The vehicle 104 can comprise an access point, such as a door access panel 110. The vehicle 104 can also comprise a latch 112 (could be an electronic or physically actuated latch) that can lock or unlock the door 108.

Various challenge-response communication flows are illustrated in FIGS. 2-4 and 6-8, which are provided below.

It will be understood that each of these challenge-response communication flows may reference elements of FIG. 1.

Figure 2:
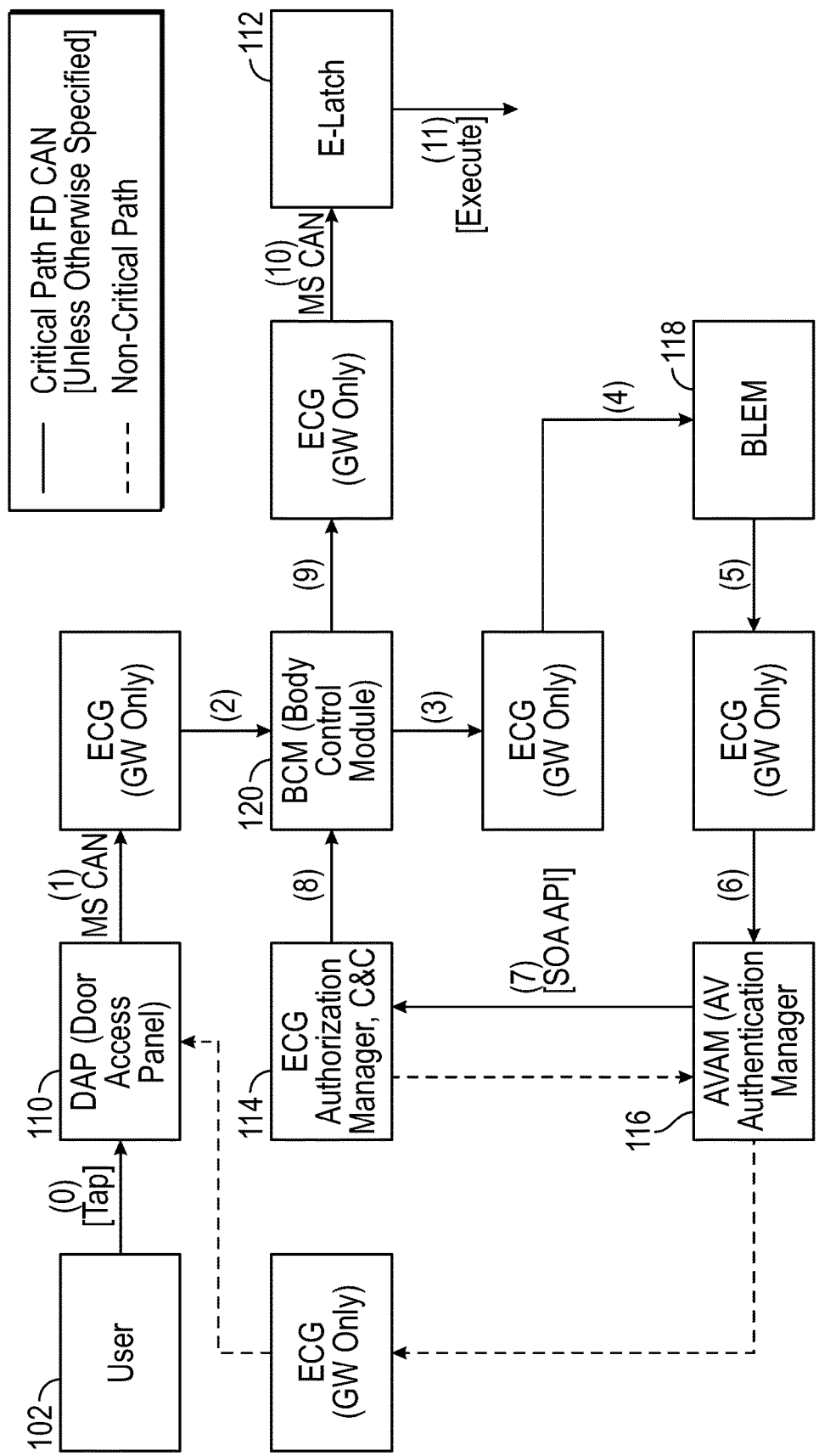
FIG. 2 is a schematic diagram of a standard challenge-response communication flow.

FIG. 2 is a schematic diagram of a standard challenge-response communication flow where a user is authenticated and authorized for each access request for a vehicle. The diagram includes the door access panel 110 (DAP, an example access point), an authorization management module 114 (e.g., enhanced central gateway (ECG) Authorization Manager, C&C (Command and Control)), an authentication management module 116 (AVAM, AV Authentication Manager), a communications module 118 (BLEM), and a body control module 120 (BCM). In general, the door access panel 110 can be used to unlock the door 108 through control of the latch 112.

An access control procedure begins with a user providing a request to the door access panel 110. For example, the user could enter a code into the door access panel 110. The door access panel 110 transmits the request to the body control module 120 which forwards the request to the communications module 118. The communications module 118 authenticates the user based on information included in the request. This could be accomplished through a call to a service provider or identity manager (not shown). If the user is authenticated, an acknowledgement is transmitted by the communications module 118 to the authentication management module 116. If a privilege determination is desired, the authentication management module 116 can query the authorization management module 114 to determine any user privileges. The authorization management module 114 and authentication management module 116 can communicate over a service-oriented architecture application programming interface in some instances. If the user is both authenticated and authorized, the authorization management module 114 can transmit a signal to the body control module 120 to cause the latch 112 to unlock the door 108. Collectively, these steps may result in a completion time of anywhere from approximately 220 milliseconds to approximately 855 milliseconds, with a typical scenario being approximately 430 milliseconds. From a customer perspective, waiting 430 milliseconds to have confirmation of an unlock request is an unsatisfactory user experience. This problem is exacerbated if the user makes the unlock request in the form of passive entry, where they grab the door handle and attempt to directly open the door. If they pull the handle before the process completes, the door 108 will not open and it may appear they are being refused access to their paid ride or simply that the system is too slow.

Figure 3:
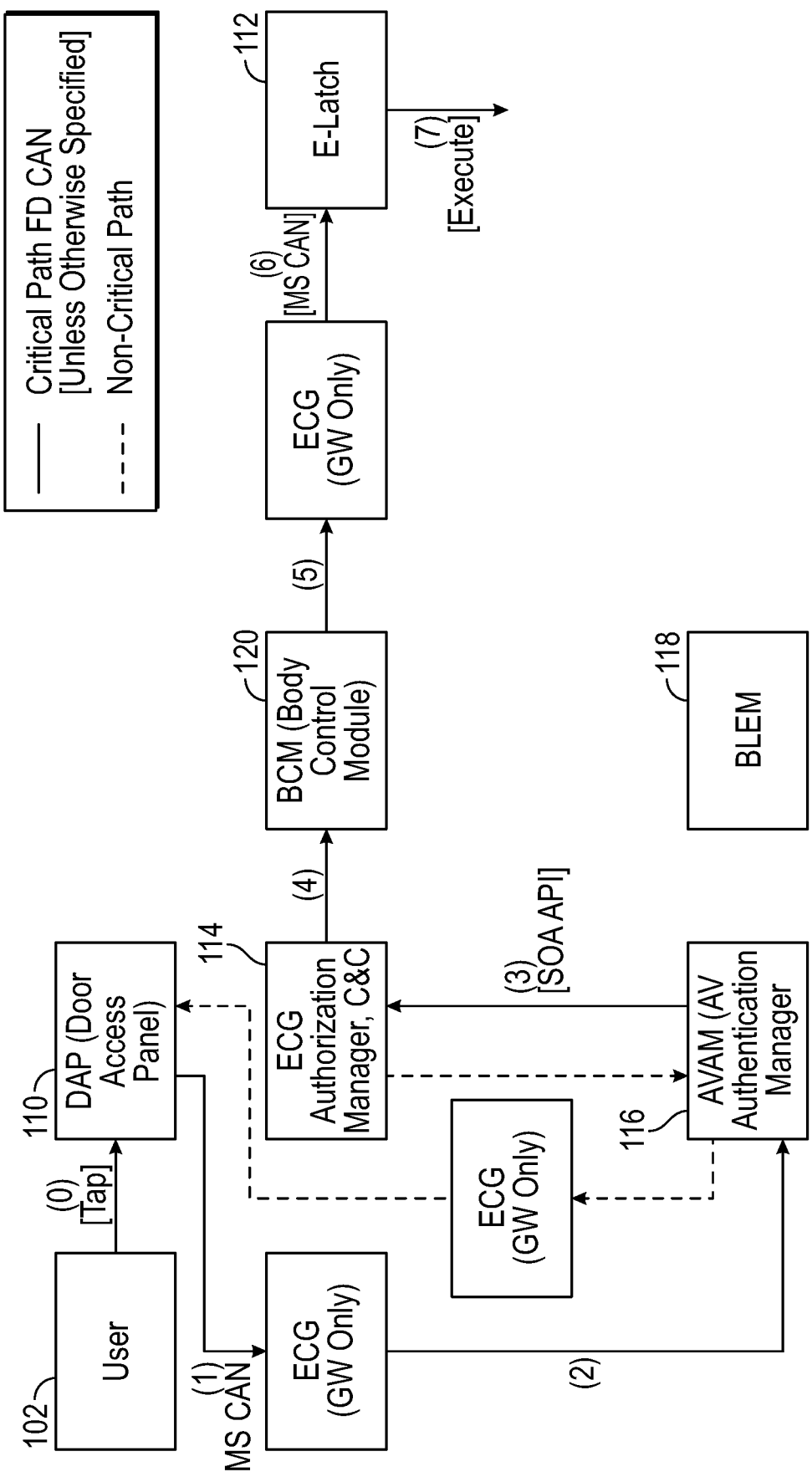
FIG. 3 is a schematic diagram of a challenge-response communication flow with pre-authentication of a user, specifically related to a door access panel unlock process.

FIG. 3 illustrates an improved challenge-response communication flow with pre-authentication of a user, specifically related to a door access panel unlock process. It will be understood that in this flow, the user 102 has previously accessed the vehicle 104 and the user has been at least previously authenticated based on a prior use of the door access panel 110 or another entry device or access point of the vehicle 104. As noted above, pre-authentication status for the user 102 can reduce latency in vehicle related requests from the user 102. Stated generally, the authorization management module 114 and the authentication management module 116 can cooperatively manage both pre-authentication and pre-authorization statues for a user that has at least been previously authenticated in an initial authentication process. While pre-authorization is not contemplated in the flow of FIG. 2, the authorization management module 114 can respond to individual queries for authorizations and privilege requests.

In operation, the user 102 can attempt to open the door 108 by entering a code into the door access panel 110. In general, the door access panel 110 indirectly controls locking and unlocking of the door 108, but this control is mediated indirectly in some instances as the door access panel 110 the authentication management module 116 and/or the authorization management module 114 may be leveraged to reduce latency in response to a request to access the vehicle 104.

In general, the communications module 118 may be configured to receive an initial request from the user to unlock the door 108 of the vehicle 104. The communications module 118 could include, for example, a Bluetooth Low Energy Module (BLEM) that communicates with the door access panel 110 to receive the user information that is indicative of an identity of the user.

If the user 102 is not in a pre-authenticated state, the communications module 118 may authenticate the user 102 based on the initial request from the user to unlock the door 108. As received by the door access panel 110, the request may include user information that is indicative of an identity of the user 102. For example, the user could enter a code into the door access panel 110, for example. The code can be used to authenticate the user 102.

If the user 102 is not in a pre-authenticated state, the communications module 118 may transmit the request to a service provider. In general, the service provider manages user identities. If the user is authenticated by the service provider, the service provider can respond with an authentication or acknowledgement to the communications module 118. In some configurations, authentication can occur at the vehicle level when the vehicle 104 includes an identity manager. Upon determining that the user 102 is authenticated, the body control module 120 can be configured to transmit signals to the latch 112 to lock or unlock the door 108 of the vehicle 104.

After the initial user authentication process, the initial authentication status of the user 102 can be transmitted to the authentication management module 116. Once the authentication management module 116 identifies that the user 102 has been initially authenticated, the authentication management module 116 can manage a pre-authenticated status for the user 102. The pre-authenticated status can be conditioned using a ruleset. For example, the ruleset can specify that the user 102 should have a pre-authenticated status maintained for at least 30 minutes. To be sure, the exact duration of the pre-authenticated status is configurable.

In another example, the ruleset can specify that the user 102 should have a pre-authenticated status as long as the user 102 is within a predetermined physical proximity to the vehicle. These physical proximity-based rules are advantageous in embodiments where passive or proximity-based authentication is possible, such as when the user is using remote keyless entry. An example flow that involves remote keyless entry is described in greater detail infra.

The authentication management module 116 can manage a pre-authenticated status for a user, as well as a request and response process for determining user privileges. A privilege query and response process can be executed between the authentication management module 116 and the authorization management module 114 for purposes of authorization and user privilege determination. The authorization management module 114 is queried for user privilege determination for each access request received from a user. Again, the authorization management module 114 and authentication management module 116 can communicate using a service oriented architecture application programming interface (SOA API), but this adds at least some latency to the flow.

In contrast with the flow of FIG. 2, the steps related initially to transmission of access requests from the door access panel 110 to the body control module 120, which further forwards the access requests to communications module 118 for authentication are eliminated. An access request can be provided directly from the door access panel 110 to the authentication management module 116, which in turn determines when a pre-authenticated status for the user exists. In further contrast with the method of FIG. 2, the estimated total time for performing the flow of FIG. 3 can range from approximately 160 milliseconds to 615 milliseconds, with an average total time being approximately 310 milliseconds.

Figure 4:
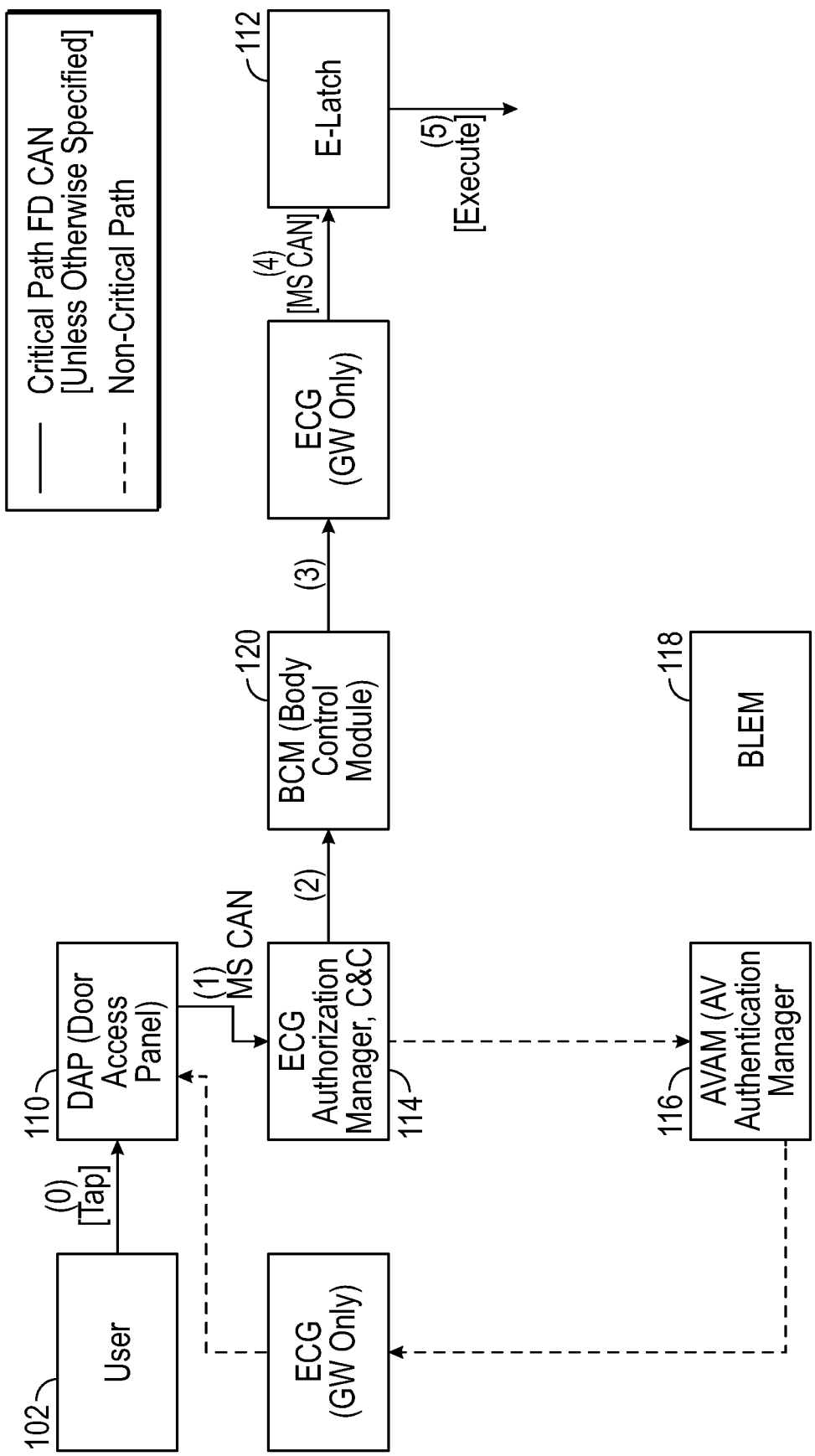
FIG. 4 is a schematic diagram of a challenge-response communication flow with pre-authentication and pre-authorization of a user, specifically related to a door access panel unlock process.

FIG. 4 illustrates a further improved challenge-response communication flow with pre-authentication and pre-authorization of a user, specifically related to a door access panel unlock process. In this flow, the user 102 enters an access request into the door access panel 110. Again, as with the flow of FIG. 2, it is assumed that the user 102 was previously authenticated during a prior access request and currently has a pre-authenticated status as managed by the authentication management module 116. To reduce latency, the authorization management module 114 can receive the vehicle access request from the door access panel 110. The authorization management module 114 can determine if the user is pre-authenticated based on pre-authentication status information previously received from the authentication management module 116. The pre-authentication status is previously received because the authentication management module 116 shares this pre-authentication status once the user is initially authenticated.

Again, when the user 102 has a pre-authenticated status, the authentication management module 116 can relay this pre-authenticated status to the authorization management module 114. In some configurations, the authentication management module 116 can transmit a trip identifier, channel information, and privileges information to the authorization management module 114 and the door access panel 110 to confirm authorization of the user.

In general, the channel information can include an indication of the access point that was used to receive the request (e.g., vehicle access request). For example, the channel could identify that the request was received from a phone inside the vehicle, from a phone approaching a driver or passenger side of the vehicle, from a phone approaching from the rear of the vehicle, or even from a specific position or location within the vehicle. The channel could indicate that the request is a passive entry request, a remote keyless entry request, or a personal identification number (PIN) request (either received inside or outside the vehicle).

The privilege information can indicate a role of the user relative to the vehicle. For example, the user could be allowed to operate the vehicle in an access role where only some vehicle functions are made available. One example of an access role could include a valet mode for the vehicle. The privilege information can indicate an elevated role that allows a user to have access to all vehicle features. Thus, the privilege information may be indicative of the features or functions that a user has been granted. The pre-authorized status could indicate that the user is authorized and has the access role or privilege status. The individual features/functions available to the access role or privilege status are pre-authorized for the user. Again, this pre-authorization occurs when the user is determined to be pre-authenticated. The combined pre-authenticated and pre-authorized status can persist for the user until the authentication management module 116 determines that the pre-authenticated status of the user is terminated or has expired.

The acknowledgement can be transmitted by the authorization management module 114 to the door access panel 110 along with a user identifier. In a subsequent access request, the door access panel 110 can transmit an unlock request directly to authorization management module 114 for immediate unlocking of the door 108 through the body control module 120. The authorization management module 114 need only confirm the validity of the user identifier included in the access request and the user is authorized (e.g., pre-authorized). As noted above the authorization management module 114 can maintain the user as having a pre-authorized status until the authentication management module 116 determines that the pre-authenticated status is no longer effective due to, for example, time expiration or when the user leaves a designated zone.

In general, the privileges information includes all or a portion of the privileges allowed for the user 102 relative to the vehicle 104. For example, the user 102 may be allowed to unlock and open the door 108. Another user may be allowed to unlock and open the door 108, but also start the engine. In another example, the user can include a package recipient who is provided access to a delivery compartment of the vehicle 104. In yet another example, the user is a ride-hailing customer who is scheduled to be picked up at a given location and time.

In contrast with FIGS. 2 and 3, the flow of FIG. 4 is significantly simplified. Empirically, the flow of FIG. 4 has a completion of time of approximately 135 milliseconds to approximately 515 milliseconds, with the average or typical time being approximately 260 milliseconds.

FIG. 5 is a table 500 that includes comparative empirical values for each architecture flow. Colum 502 comprises values associated with the flow of FIG. 2, whereas column 504 comprises values associated with the flow of FIG. 3, and column 506 comprises values associated with the flow of FIG. 4. Individual time-per-action calculations found in each of the challenge-and-response flows of FIGS. 2-4 are also illustrated in the rows of the table 500.

Figure 6:
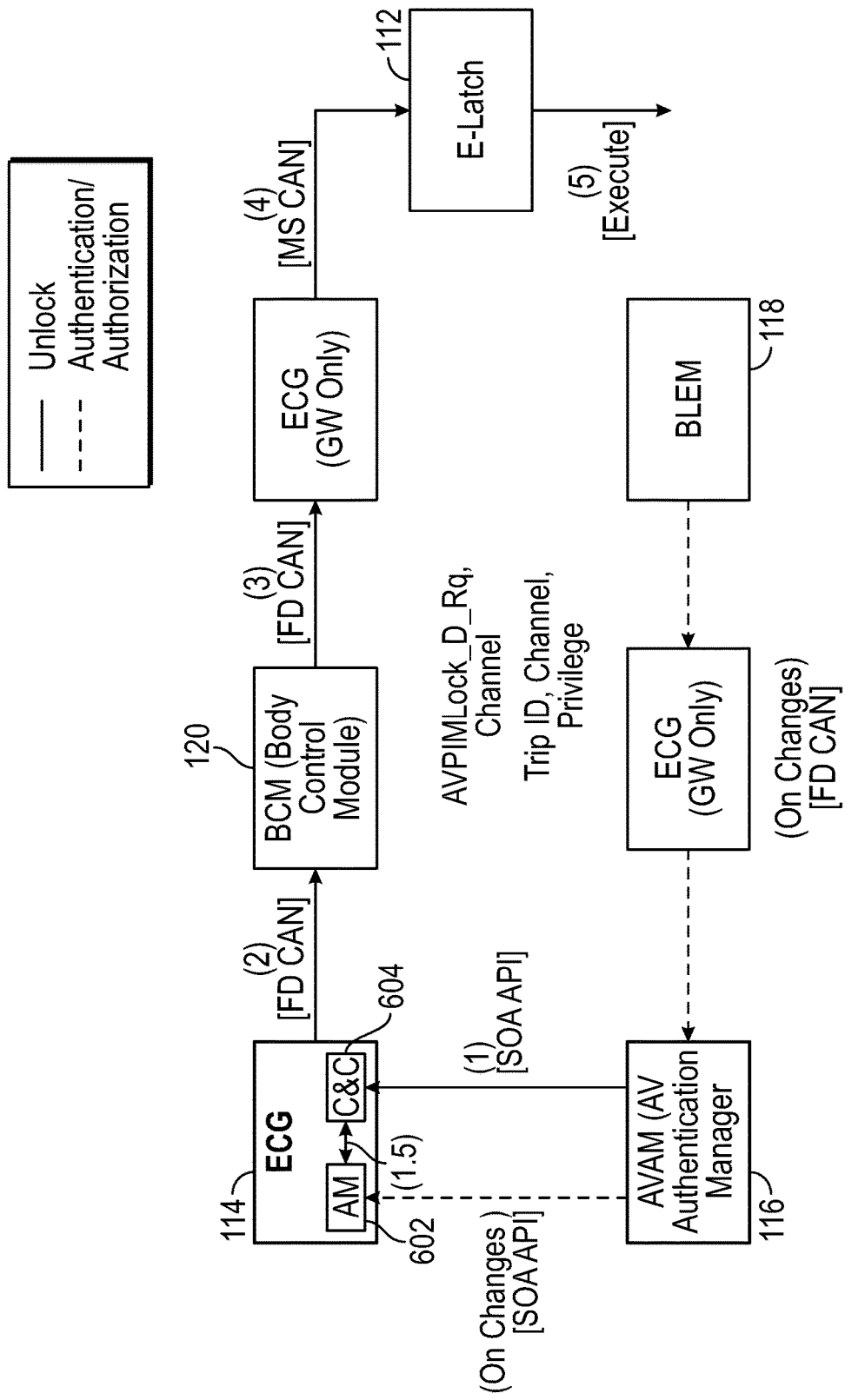
FIG. 6 is a schematic diagram of a challenge-response communication flow with pre-authentication and pre-authorization of a user, specifically related to a remote keyless entry lock control process.

FIG. 6 is a schematic diagram of a challenge-response communication flow with pre-authentication and pre-authorization of a user, specifically related to a remote keyless entry lock control process or an approach unlock process. The diagram includes the communications module 118 that is configured to authenticate a user, either initially, or after a change is detected in the pre-authentication of the user. Again, the pre-authentication status of the user can expire or be terminated. After termination or expiration of the pre-authentication status, the user can be re-authenticated by the communications module 118. This pre-authenticated status is managed at the authentication management module 116 level. The authentication management module 116 can communicate with the authorization management module 114 to pre-authorize the user after pre-authentication. An unlock command can be transmitted from the authentication management module 116 to the body control module 120 for unlocking of the door through control of a latch 112. In this example, functionalities of the authorization management module 114 (which is an enhanced central gateway) can be separated into an authorization manager (AM) 602 and a command and control module 604. The command and control module (C&C) 604 handles the unlock command received from the authentication management module 116 that is forwarded to the body control module 120.

Figure 7:
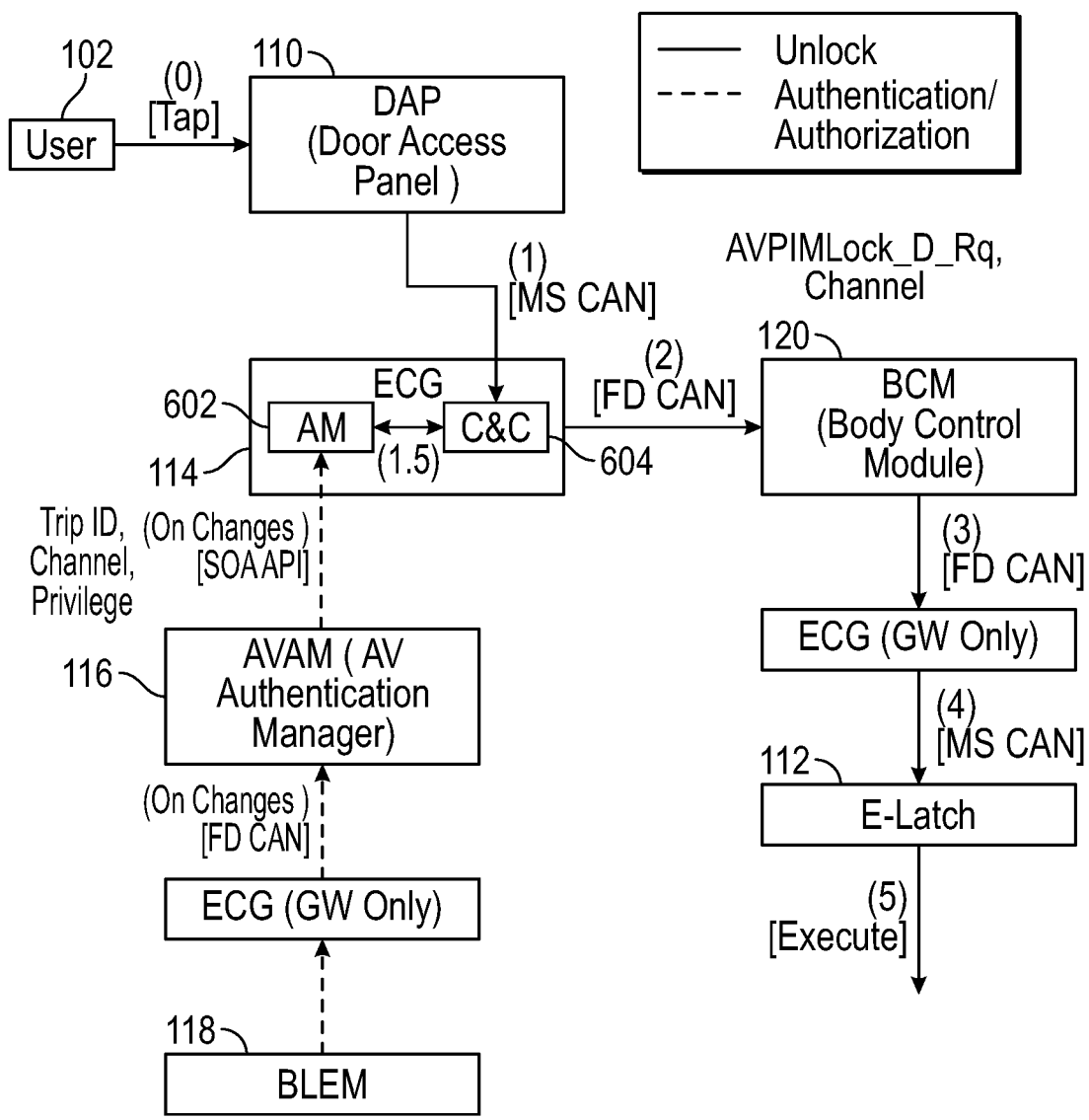
FIG. 7 is a schematic diagram of a passive entry challenge-response communication flow with pre-authentication and pre-authorization of a user, specifically related to a door access panel unlock process.

FIG. 7 is a schematic diagram of a passive entry challenge-response communication flow with pre-authentication and pre-authorization of a user, specifically related to a door access panel unlock process. This process is similar to the challenge-response communication flow of FIG. 6, with the exception that the door access panel 110 is used as an access point rather than an approach or keyless entry.

Figure 8:
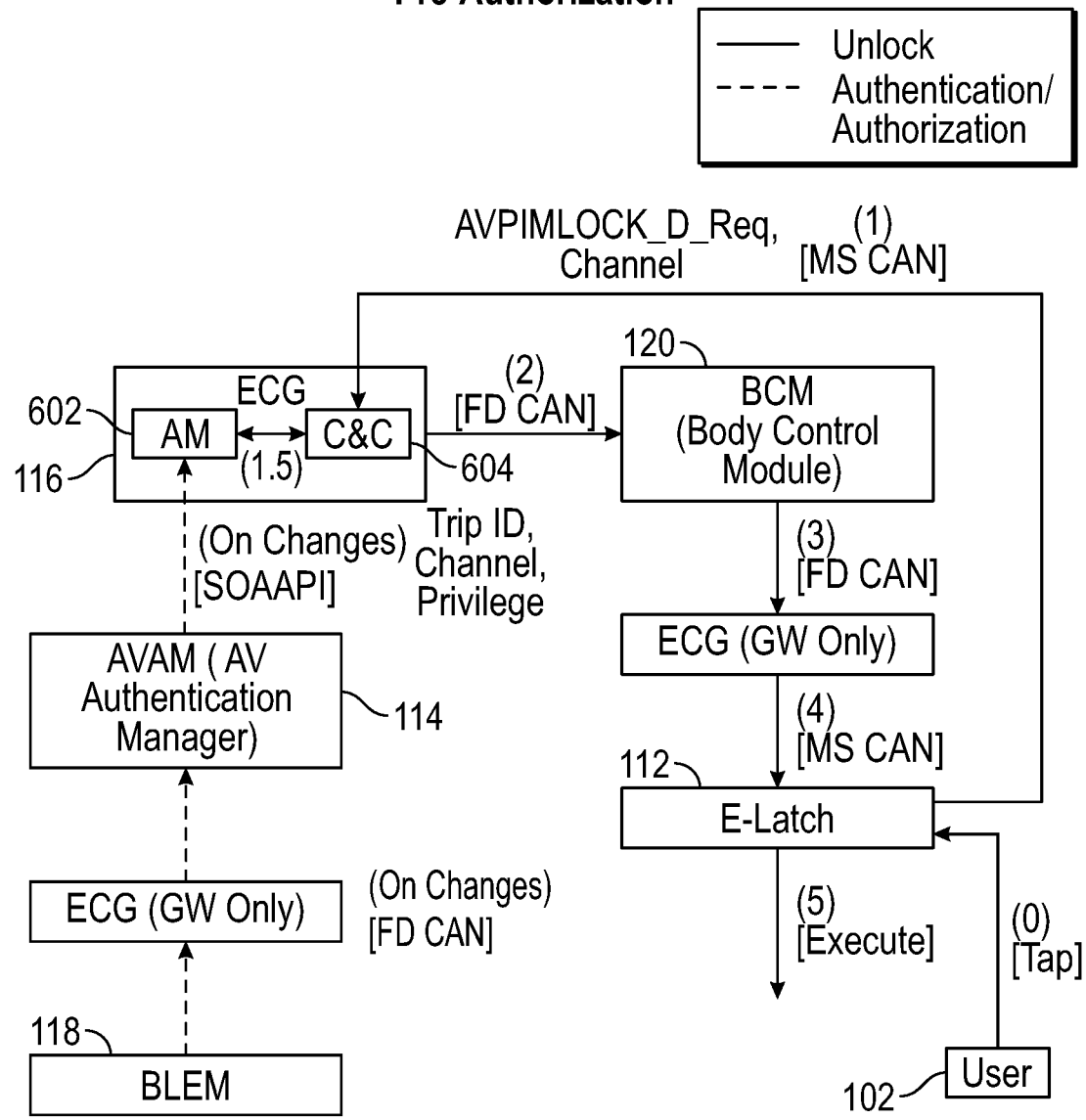
FIG. 8 is a schematic diagram of a passive entry challenge-response communication flow with pre-authentication and pre-authorization of a user, specifically related to an e-latch unlock process.

FIG. 8 is a schematic diagram of a passive entry challenge-response communication flow with pre-authentication and pre-authorization of a user, specifically related to an e-latch unlock process. This process is similar to the challenge-response communication flow of FIG. 7, with the exception that the vehicle access request is received at the latch 112. That is, the latch 112 is enabled to receive touch input from the user as an access request.

Figure 9:
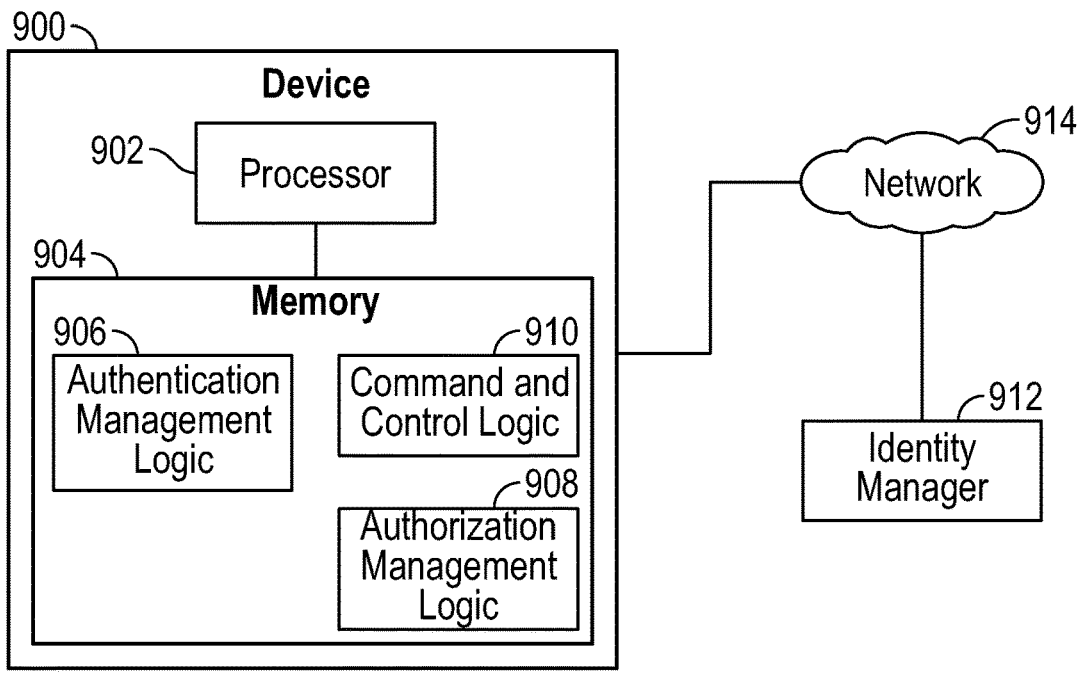
FIG. 9 is a schematic diagram of an example device that can be configured to respond to determine pre-authentication and pre-authorization of a user and to process vehicle access requests in response.

FIG. 9 is a schematic diagram of an example device 900 that can be configured to provide any of the challenge-response communication flows of FIGS. 2-4 and 6-8. The device 900 can comprise a processor 902 and memory 904. The memory 904 stores logic related to challenge-response communication that can include, but is not limited to, aspects of pre-authentication and pre-authorization as disclosed throughout. In some configurations, the memory 904 can also store command and control logic that would trigger vehicle responses, such as door, lift gate locking/unlocking and/or opening/closing, engine start, panic mode, alarm activation/deactivation, and the like. In sum, the device 900 can be configured to perform aspects that have otherwise been described as being performed by a body control module. In some configurations, the enhanced central gateway functions that include authorization and command/control can be combined with the functions of the body control module. When referring to functions performed by the device 900, it will be understood that this includes execution of logic by the processor 902. In sum, the memory 904 can store authentication management logic 906, authorization management logic 908, and command and control logic 910. The device 900 can be configured to perform complete authentication of a user with a service provider or other identity manager 912. To be sure, the identity manager can be local to the vehicle or can be located remotely. The device 900 can communicatively couple to the identity manager 912 over a network 914, which can include any private or public network such as WiFi, cellular, or the like. The network 914 could include a short-range wireless protocol such as Bluetooth, near-field communication, and the like.

In one example use case, the device 900 can be configured to receive a vehicle access request from a user via an access point of a vehicle. The device 900 can determine which challenge-response logic to use based on the vehicle access request. For example, a challenge-response logic selected for a vehicle access request received from a door access panel may be treated differently than a challenge-response logic selected for a vehicle access request received from a keyless entry device.

The device 900 can be configured to determine that the user has a pre-authenticated status and a pre-authorized status. As noted throughout, the user has the pre-authenticated status when the user has been previously initially authenticated and the pre-authenticated status has been granted. Further, the pre-authorized status is determined prior to receiving the vehicle access request. The device 900 can grant access to the vehicle when the user has a pre-authenticated status and pre-authorized status. The access that is granted is based on a privilege of the user and can include the user being provided any vehicle feature or access allowed under the privilege of the user. As noted above, the privilege can be related to roles for users or for an operating mode for the vehicle (e.g., a valet mode or an access or enhanced mode).

In some instances, the device 900 can select one of the challenge-and-response flows of FIGS. 2-4 and 6-8 are appropriate. If the device 900 determines that a passive entry is being used, any of the passive entry related challenge-and-response flows can be used. On the other hand, if an approach unlock is being used, any of the approach unlock related challenge-and-response flows can be used.

Figure 10:
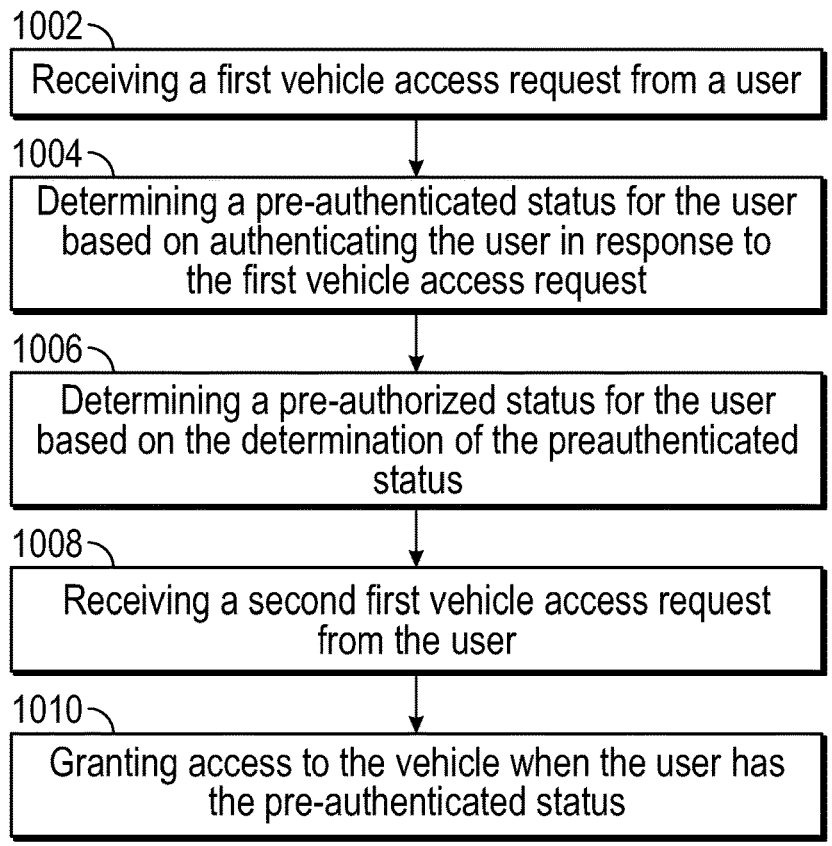
FIG. 10 is a flowchart of an example method of the present disclosure.

FIG. 10 is a flowchart of an example method of the present disclosure. The method can include a step 1002 of receiving a first vehicle access request from a user. The user can be initially authenticated from this request. Also, the first vehicle access request could include a request received after a pre-authenticated status of the user has been terminated or has lapsed. In general, the authentication considered with regard to this first vehicle access request requires a full authentication check using an identity manager.

Next, the method can include a step 1004 of determining a pre-authenticated status for the user based on authenticating the user in response to the first vehicle access request. If the user is pre-authenticated, the method can include a step 1006 of determining a pre-authorized status for the user based on the determination of the pre-authenticated status.

The method can include a step 1008 of receiving a second first vehicle access request from the user, as well as a step 1010 of granting access to the vehicle when the user has the pre-authenticated status. To be sure, access to the vehicle is conditioned upon the pre-authorized status of the user.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying out or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A system, comprising:
    an access point of a vehicle that is configured to receive a request from a user to unlock a vehicle door;
    an authorization management module that is configured to:
    receive the request from the access point of the vehicle;
    manage a pre-authorization status for the user as authenticated by the vehicle, the pre-authorization status being predicated a pre-authenticated status of the user;
    verify user permissions related to the access point; and output an authorization acknowledgement that confirms requests for which the user has been pre-authorized, the authorization acknowledgement being transmitted to the access point; and an authentication management module that is configured to manage the pre-authenticated status for the user, the pre-authenticated status being predicated on an initial authentication of the user, wherein the authentication management module also receives the authorization acknowledgement from the authorization management module.

2. The system according to claim 1, wherein the authentication management module and the authorization management module cooperatively determine that the user has the pre-authorized status and the pre-authenticated status prior to receiving the request.

3. The system according to claim 1, further comprising a communication module that is configured to:

determine the initial authentication of the user; and transmit the initial authentication of the user to the authentication management module, as well as a location of an entry device used by the user, wherein the entry device is used to provide the request to unlock the vehicle door to the access point.

4. The system according to claim 3, wherein the entry device comprises a mobile device or a key fob.

5. The system according to claim 3, wherein the entry device comprises a door access panel.

6. The system according to claim 1, wherein the authorization management module is configured to cancel the pre-authorized status of the user when a presence of the user is no longer detected.

7. The system according to claim 1, wherein the authentication management module is configured to cancel the pre-authenticated status of the user after a period of time.

8. The system according to claim 1, wherein the authentication management module transmits to the authorization management module a trip identifier, a channel that is indicative of the access point, and privilege of the user, the privilege being indicative of a role for the user.

9. The system according to claim 1, further comprising a body control module that controls locking and unlocking of the vehicle door.

10. The system according to claim 9, wherein the body control module causes unlocking of the vehicle door in response to the authorization acknowledgement.

11. A device, comprising:
a processor; and
a memory for storing instructions, the processor executing the instructions to:
receive a vehicle access request from a user via an access point of a vehicle;
determine that the user has a pre-authenticated status and a pre-authorized status, wherein the user has the pre-authenticated status when the user has been previously initially authenticated and the pre-authenticated status has been granted, further wherein the pre-authorized status is determined prior to receiving the vehicle access request; and
grant access to the vehicle when the user has a pre-authenticated status and pre-authorized status.

12. The device according to claim 11, wherein the processor is configured to determine an initial authentication status of the user prior to receiving the vehicle access request.

13. The device according to claim 11, wherein the pre-authorized status allows the user to lock or unlock a door, unlock a cargo door or lift gate, trigger a panic mode of the vehicle, open or close a sliding door, start an engine of the vehicle, or any combination thereof.

14. The device according to claim 11, wherein the processor generates a trip identifier, a channel, and a privilege level for the user that is indicative of privileges associated with the pre-authorized status, the channel being indicative of the access point.

15. A method, comprising:
receiving a first vehicle access request from a user;
determining a pre-authenticated status for the user based on authenticating the user in response to the first vehicle access request;
determining a pre-authorized status for the user based on the determination of the pre-authenticated status;
receiving a second vehicle access request from the user; and
granting access to the vehicle when the user has the pre-authenticated status in response to the second vehicle access request, wherein access to the vehicle is conditioned upon the pre-authorized status of the user.

16. The method according to claim 15, further comprising canceling the pre-authorized status of the user when a presence of the user is no longer detected.

17. The method according to claim 15, further comprising canceling the pre-authenticated status of the user after a period of time.

18. The method according to claim 15, wherein the pre-authorized status allows the user to lock or unlock a door, unlock a cargo door or lift gate, trigger a panic mode of the vehicle, open or close a sliding door, start an engine of the vehicle, or any combination thereof.

19. The method according to claim 15, wherein the pre-authorized status is based on a privilege of the user.

20. The method according to claim 15, further comprising determining when the first vehicle access request or the second vehicle access request is an approach-based request or a passive entry request.

* * * * *